June 8, 1965
R. A. WHITMORE ETAL
3,187,892
CRACKED EGG SHELL DETECTOR
Filed May 14, 1963
3 Sheets-Sheet 1
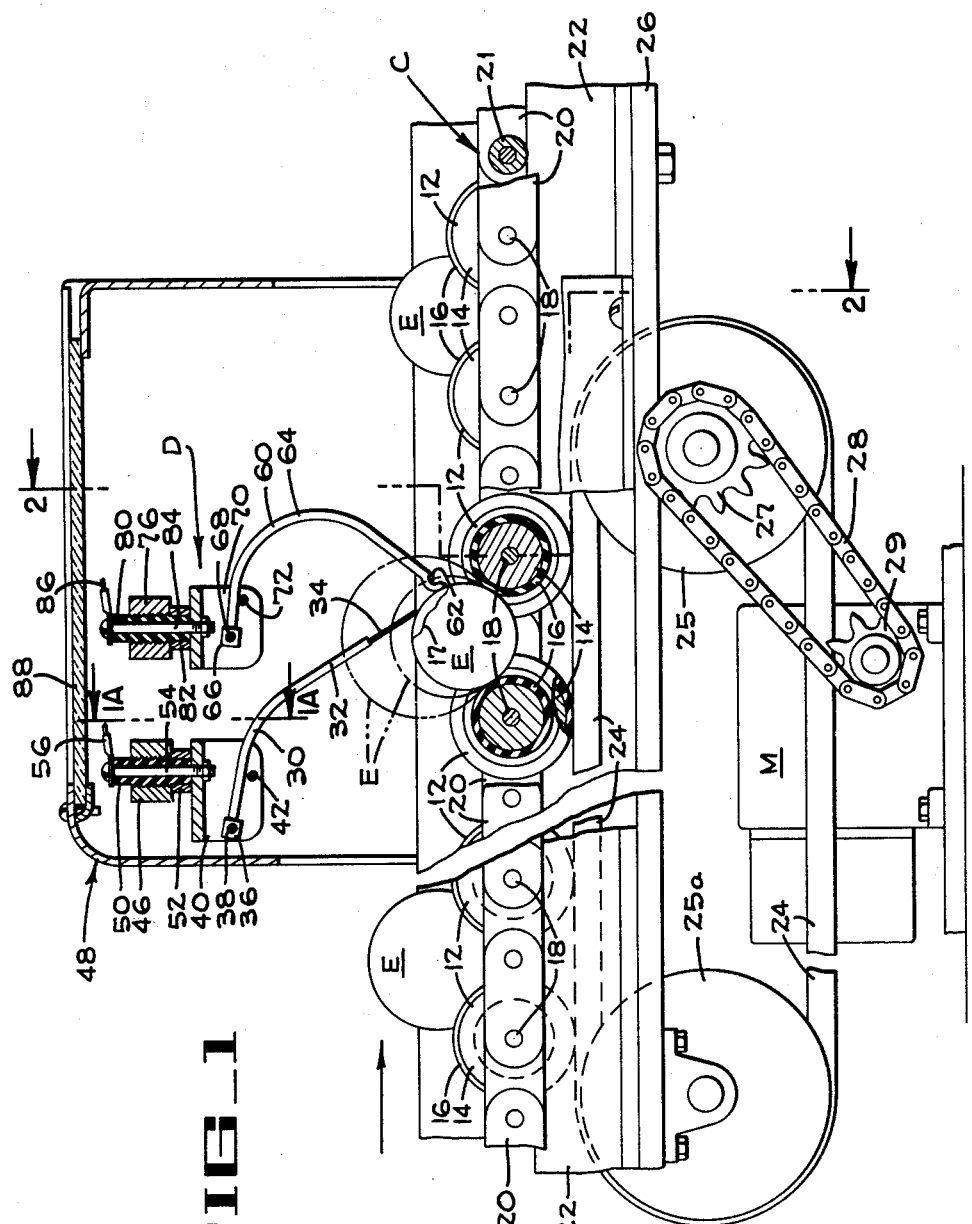
FIG_1
INVENTORS
ROBERT A. WHITMORE
HAROLD J. MUMMA
BY Hans G. Hoffmeister
ATTORNEY June 8, 1965   R. A. WHITMORE ETAL   3,187,892
CRACKED EGG SHELL DETECTOR
Filed May 14, 1963   3 Sheets-Sheet 2
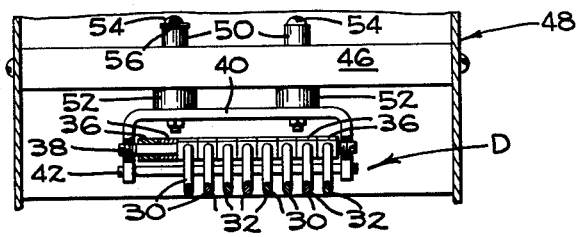
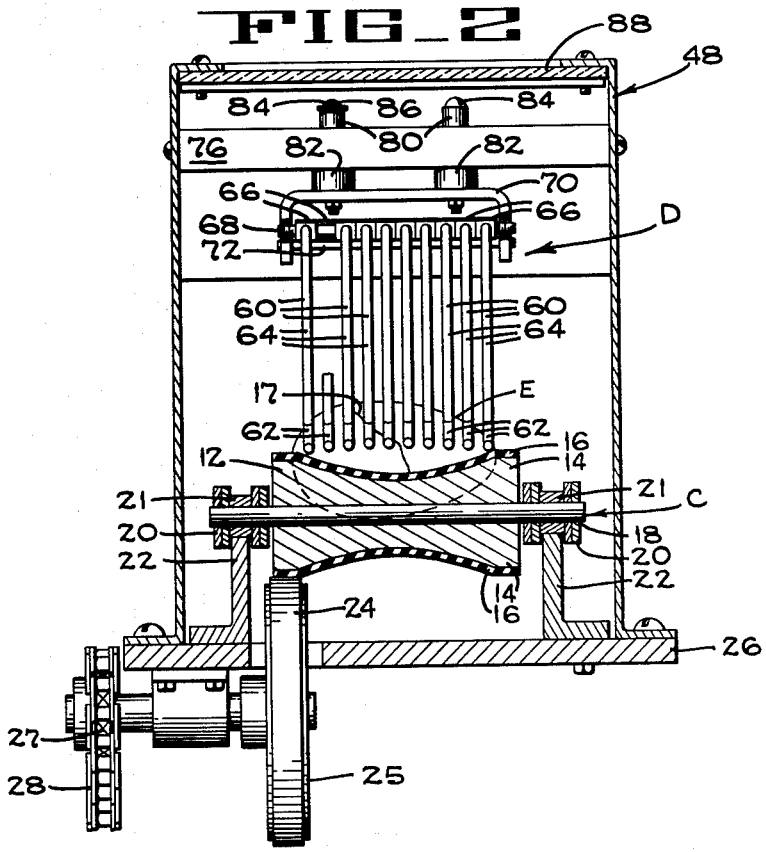
INVENTORS
ROBERT A. WHITMORE
HAROLD J. MUMMA
BY Hans G. Hoffmeister
ATTORNEY

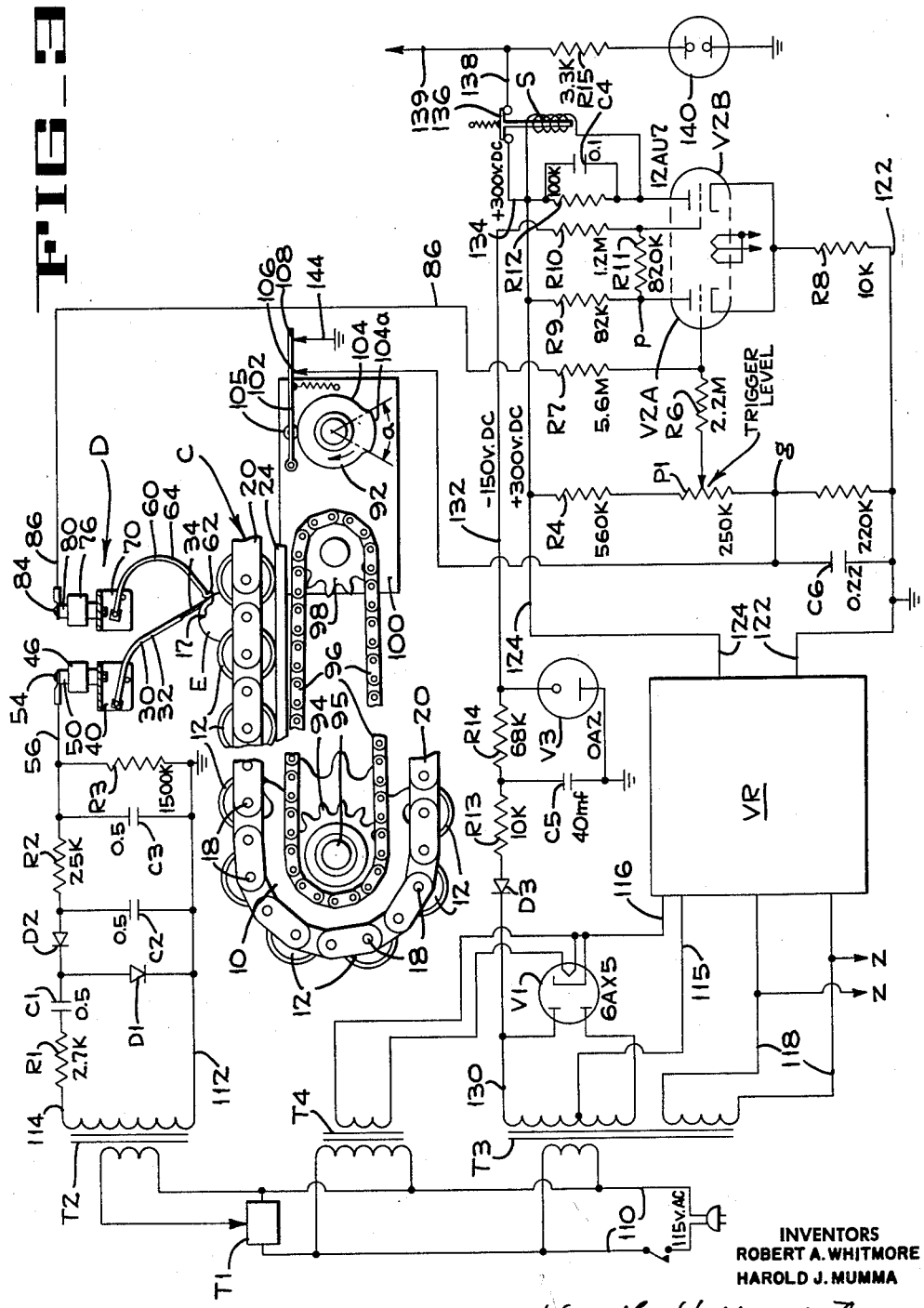

United States Patent Office 3,187,892
Patented June 8, 1965

3,187,892
CRACKED EGG SHELL DETECTOR
Robert A. Whitmore and Harold J. Mumma, Riverside, Calif., assignors to FMC Corporation, San Jose, Calif., a corporation of Delaware
Filed May 14, 1963, Ser. No. 280,352
4 Claims. (Cl. 209—81)

This invention relates to measuring and testing in general, and more particularly to the detection of cracks in the shells of eggs, such as chicken eggs.

The inspection of eggs for market usually includes a visual inspection operation, wherein the condition of the interior of the egg is determined, and blood spots are detected. This inspection operation, known as candling, is usually performed manually by operators, and is carried out under illumination conditions which are not conducive to the detection of cracks in the shells of the eggs. Furthermore, eggs may be candled for blood spots by optico-electronic means, such as the apparatus described in the patent to Mumma et al. No. 3,031,077, issued April 24, 1962, and assigned to the assignee of the present invention. If the eggs are quality inspected in this manner, such inspection will not reveal the presence of cracks in the eggshells, and the detection of such cracks will require auxiliary personnel in the egg handling line.

An object of the present invention is to detect cracks in eggshells automatically, without the need for operators that visually inspect the eggs for cracks.

Another object is to detect cracks in the shells of eggs while the eggs are being handled automatically by a conveyor system.

A further object of the invention is to detect cracks in the shells of eggs by the use of simple and economical apparatus, which has a reliability that meets commercial and government standards in terms of crack detection, and which inspects the entire egg circumference.

The manner in which these and other objects of the present invention may be accomplished by those skilled in the art, will be apparent from the following detailed description of the invention.

In the drawings:

FIGURE 1 is a fragmentary side elevation of a conveyor and crack detecting probe unit of the present invention, with parts in section.

FIGURE 1A is a fragmentary elevation of the high voltage probe assembly taken on lines 1A—1A of FIGURE 1, and with parts broken away.

FIGURE 2 is a section through the conveyor and probe unit taken on lines 2—2 of FIGURE 1, with parts omitted.

FIGURE 3 is a diagram of the conveyor and probe unit, including the circuitry involved in the detection of cracks in the shells of eggs.

Stated in broad terms, a method and apparatus for detecting cracks in the shells of eggs forming the present invention includes measuring the current flowing between spaced zones on the shell of an egg, such as between probes having a high potential established between such probes. A reject signal (indicating a cracked shell) is generated when the current flowing between the probes exceeds the current which flows between the probes when an uncracked egg is being inspected. In accordance with the invention, a cracked egg shell offers a reduced electrical resistance and hence permits a slightly higher current flow between the probes than does a sound egg, so that by measuring this current, a reject signal is developed as required. In the description that follows, the mechanical elements will first be described, followed by a description of the electrical circuit, and its operation.

*Conveyor mechanism.*—Details of typical conveyor mechanism suitable for use in the present invention appear in FIGS. 1 and 2, and are also shown diagrammatically in the upper portion of FIG. 3. A conveyor C transports the eggs beneath a crack detector D. The eggs may have previously passed through washing and drying units, the presence and nature of which form no part of the present invention. A conveyor C which is suitable for use in the crack detector D of the present invention, may be part of a complete egg handling weighing and packaging system, such as that described in detail in the patent to Mumma 2,895,274, issued July 21, 1959, and assigned to the assignee of the present invention.

The conveyor C spaces and conveys eggs E from left to right, as viewed in FIG. 2, and as viewed in the diagram of FIG. 3. An idler sprocket 10 for the conveyor C is shown in FIG. 3. The conveyor being described is intermittently driven by means not shown, and which do not form part of the present invention. An intermittent drive for the conveyor C is described in the application of Mumma Serial No. 66,335, filed October 31, 1960, which application is also assigned to the assignee of the present invention. The aforesaid Mumma conveyor has six lanes, for transporting six rows of eggs, but since the number of lanes that make up the conveyor C form no part of the present invention, a single lane conveyor is illustrated in the drawings, and such will be described. It is understood that any number of conveyor lanes, with additional crack detecting mechanism corresponding to each lane, can be added within the scope of the present invention.

The eggs E, which are transported on the conveyor C, rest between adjacent pairs of hourglass shaped rollers 12, best seen in FIGS. 1 and 2 of the drawings. As seen in FIG. 2, the hourglass shape rollers 12 have a rigid core 14, with a softer rubber cover 16 bonded thereto, for resiliently supporting the eggs E. A crack in the shell of an egg under inspection by the detecting mechanism D of the present invention, is indicated at 17 in the drawings. The rollers 12 are rotatably mounted on conveyor C by pins 18, which pins are carried in the links of laterally spaced conveyor chains 20. It is immaterial whether the pins 18 rotate in the chain links, or whether the rollers 12 rotate on the pins, so long as the rollers 12 are freely rotatable.

The conveyor chains 20 are of the usual link and roller type, and as best seen in FIG. 2, the upper or conveying reaches of the two chains 20 have their rollers 21 supported on guide bars 22, this construction being known in the egg conveyor art and forming no part of the present invention. In accordance with the present invention, when the eggs are beneath the high voltage sensing probes, the eggs are rotated through one revolution or more, dependent upon their diameter. This rotation of the eggs for inspection, when the eggs are under the probes, occurs during the corresponding dwell period of the egg conveyor.

The above mentioned rotation of the eggs is effected by rotation of the rollers 12, which is accomplished by causing the ends of the rollers to engage a V-belt 24 trained around a drive pulley 25 and an idler pulley 25a. Both the conveyor chain guide bars 22 referred to above, and the shafts of the V-belt pulleys 25 and 25a are mounted on a base or frame member 26. In order to drive V-belt pulley 25, the pulley shaft has a sprocket 27 secured thereto, which sprocket is driven by a chain 28 and a sprocket 29, the latter being rotated by a motor and gear reduction unit M. The V-belt 24 (FIG. 1) may extend forwardly of the crack detecting unit D to rotate the eggs under washer and drier units (not shown) which form no part of the invention.

This completes the description of the elements of the conveyor mechanism that are essential to an understanding of the present invention.

*Probe mechanism.*—Details of the construction and arrangement of the high voltage probe mechanisms of the present invention appear in FIGS. 1, 1A and 2, the mechanism being shown diagrammatically in FIG. 3. There are two sets, or rows of probes, and these engage the egg E under inspection at circumferentially spaced zones. One set or row of probes is a row of high voltage probes 30, and each probe is formed of a bent current conducting metal rod or body 32, terminating in a wire tip 34, soldered to the body of the probe. At the upper end of each high voltage probe 30, is a hub or pivot portion 36, and as seen in FIGS. 1 and 1A, each hub is apertured for individual pivotal mounting on a transversely extending probe mounting screw 38. Screw 38 is threaded into a U-shaped mounting bracket 40, as best seen in FIG. 1A. The lowermost position of each high voltage probe 30 is determined by a stop pin 42, which is mounted transversely of the U-shaped probe mounting bracket 40.

The probe mounting bracket 40 is secured to a transversely extending bar 46, the opposite ends of which are screwed or otherwise secured to the side walls of a housing 48 that surrounds the probe mechanism. As seen in FIG. 1, the U-shaped bracket 40 that mounts the high voltage probes 30, is insulated from the mounting bar 46. This insulated mounting is provided by two insulating bushings 50, each of which is threaded or otherwise secured in the transverse mounting bar 46. An insulating spacing washer 52 is placed between the mounting bar 46 and each U-shaped probe mounting bracket 40. A pair of bolts or screws 54 extend through the bushings 50 and the probe mounting bracket 40, to support the probe mounting bracket 40 on the mounting bar 46, while maintaining the bracket 40 insulated from the mounting bar 46, and the housing or cabinet that surrounds the probe assembly. A high voltage supply lead 56 extends from the upper portion of one of the mounting screws 54 which supports the U-shaped bracket 40 for high voltage probes 30.

As seen in FIGS. 1 and 2 a high voltage contact probe assembly is provided which, is generally like the high voltage probe assembly just described. A front view of the high voltage contact probe assembly appears in FIG. 2, and the general construction of the mounting of this assembly is like that for the mounting of the high voltage probes 30 just described.

The high voltage contact probes are indicated at 60, and each probe is formed with a curved end portion 62 for engaging the shells of the eggs E under inspection, while accommodating passage of the eggs beneath the probes. The contact probes 60 are formed with curved body portions 64, and each probe 60 has a hub 66 like the hub 36 of the high voltage probes 30. As best seen in FIG. 2, the hubs 66 of the high voltage probes are pivotally mounted on a transverse mounting pin 68, which is threaded into or secured to a U-shaped bracket 70, having the same general configuration as the U-shaped bracket 40 for the high voltage probes 30 previously described. Both sets of probes, the high voltage probes 30, and the contact probes 60, are arranged so as to span substantially the entire length of the eggs E, which pass beneath the probes. This arrangement facilitates reliable detection of cracks 17 appearing in the shells of the eggs.

Mounted in the U-shaped bracket 70 that supports the contact probes 60, is a stop pin 72 that limits the lowermost position of the probes, and corresponds to the stop pin 42 for the high voltage probes previously described. The U-shaped bracket 70 for the contact probes 60 is mounted on a transverse bar 76, that is secured to the side walls 48 of the housing, in the same manner as is the bar 46 for the high voltage probes 30. The U-shaped bracket 70 is mounted on the bar 76 in an insulated relation thereto, just as is the bracket 40 for the high voltage probes 30. In order to mount the brackets 70 on the bar 76, insulating bushings 80, FIG. 1, are threaded into the transverse bar 76, and spacer washers 82, and through bolts or screws 84 are also provided, as previously described. A terminal extends from one of the screws 84 which mounts a sensing lead 86, that connects to the reject control mechanism (FIG. 3) to be described presently. The top of the housing 48 that encloses the probes, is protected by a transparent cover 88, which may be removed for access to the probes.

As indicated in broken lines in FIG. 1, a range of sizes (diameters) of eggs E is accommodated by the probes. The egg E shown in solid lines, is about the smallest size egg that the probe device will be called upon to inspect. As mentioned, the intermittent drive for the conveyor C is such, that during the dwell portion of their advance cycle, the eggs are centered beneath the probes. The eggs are turned underneath the probes, when in the position illustrated in FIGS. 1 and 3, in the direction of the arrows. The linear speed of the egg turning V-belt 24 is sufficient to cause the V-belt to move about 6″ during the dwell period, which will impart one revolution to the largest diameter eggs normally encountered in operation.

*Ready signal contacts.*—In accordance with the present invention, contact means are provided that are synchronized with the intermittent motion of the conveyor C, to ready the reject signal control circuit or trigger means for receiving current flow information from the contact probes 60. This contact mechanism is illustrated diagrammatically at the upper portion of FIG. 3. It includes a circuit ready cam 92, which is turned one revolution during the conveyor dwell period, between each intermittent advance of the egg conveyor C.

The mechanism for driving the ready cam 92 is not critical to the invention, so long as it is synchronized with the conveyor C. The drive for the cam illustrated in FIG. 3 includes a sprocket 94 mounted on the shaft 95 for the conveyor idler sprocket 10, previously referred to. Sprocket 94 drives a chain 96, which drives a smaller sprocket 98 mounted on a step-up gear box 100. The total step-up between the conveyor chain idler sprocket 10 and the ready cam 92, is such that the cam 92 makes one revolution for each advance of the conveyor C.

The cam 92 operates a switch or contactor arm 102, which is shown in its closed position in the diagram of FIG. 3. The cam 92 includes a low profile, signal ready section 104, which occupies the majority of the circumference of the cam. As seen in FIG. 3, when the low section 104 is under a roller 105 on the switch arm 102, contacts 106, 108 of the switch are spring closed.

The ready cam 92 also includes a signal cut out lobe 104a, which operates switch arm 102 to open the switch contacts, in a manner obvious from the drawings. In the position of the ready cam illustrated in FIG. 3, the conveyor C is in its dwell period, contacts 106, 108 are closed, and the egg E is being rotated for inspection. When the egg conveyor C moves from the position in its dwell cycle illustrated in FIGS. 1 and 3, to the same position in the next dwell cycle, the conveyor will have moved through a distance equal to the center to center spacing of the axes of the rollers 12. During this motion, the ready cam 92 will have made one complete revolution from the position illustrated in the diagram of FIG. 3. The arc "*a*" of the signal cut out lobe 104a is sufficient to insure that an egg just inspected will clear the probes before the next egg engages them.

This completes the detailed description of the conveyor, probe and ready cam units of the present invention.

*High voltage circuit.*—As previously mentioned, in accordance with the present invention, a high potential is applied across the sets or rows of probes 30 and 60. When an uncracked eggshell is between the probes, the eggshell acts as a high dielectric insulator, and the high electrical resistance of the uncracked shell severely limits the current flow between the rows of probes. When a crack is brought within the vicinity of the probes, the electrical resistance of the eggshell between the zones of contact of the two rows of probes with the eggshell decreases, and the current flow through or along the shell, hence between the probes, increases. This produces a reject signal in a manner to be described presently, but for effective operation a relatively high potential must be applied across the probes by the high voltage circuit, now to be described.

Turning to the schematic diagram of FIG. 3, power for the high voltage circuit is supplied by lines 110, which are connected to a 115 volt A.C. supply. A variable voltage transformer T1 is connected across the lines 110, and the adjustable secondary of the variable transformer T1 is connected to the primary of a high voltage supply transformer T2. Details of the variable voltage transformer T1 do not form part of the present invention, and the construction thereof is not illustrated, such units being available to and well known in the trade.

The secondary of the high voltage transformer T2 has a ground lead 112, and a high voltage lead 114. The alternating high voltage current in lead 114 is converted into high voltage direct current having a negative potential relative to ground, by a rectifier and filter circuit. The alternating current (A.C.) in lead 114 passes through a resistor R1, and an isolation condenser C1. Typical values of these, and the various other circuit components are given on the schematic diagram of FIG. 3. Rectification of the high voltage alternating current in lead 114 is provided by a pair of diodes D1 and D2, connected in the conventional manner, and the pulsating direct current (D.C.) flowing into diode D2, is smoothed by a filter resistor R2 in the high voltage line, and a pair of filter condensors C2 and C3 that bridge the resistor R2 and connect to the ground line 112. Pulsations in the high voltage supply line connecting to line 56 of the probes 30 are further smoothed by a high resistance, current limiting resistor R3, connecting the D.C. supply line to ground. By adjustment of the variable output transformer T1, the voltage on the lead 56 previously described, which connects the high voltage probes 30 to the negative high voltage supply, can be varied from −500 volts D.C. to −1500 volts D.C. This provides adjustment of optimum operation, as atmospheric and other operational conditions vary. This completes the description of the high voltage circuit.

*Reject control circuit.*—The reject control circuit includes resistance voltage divider means for measuring the current flow across the probes, and a control or trigger circuit that initiates a reject signal when such current exceeds a set value.

Referring to the schematic diagram of FIG. 3, power for the reject control circuit is supplied by a power transformer T3. As seen in the diagram, the opposite sides of the secondary of the power transformer T3 connect to the plates of a full wave rectifier tube V1, the cathode type 6AX5 being illustrated in the schematic. Pulsating direct current enters a combined filter and voltage regulatator unit VR, from a line 116 connected to the cathode of the rectifier tube V1. The return or ground line 115 for the voltage regulator VR connects to the center tap of the secondary of power transformer T3. The construction and wiring of the voltage regulator VR are not illustrated, because the device is conventional, and forms no part of the present invention, its purpose merely being to supply regulated, positive direct current (B+) for the reject control circuit. The filament for the rectifier tube V1 is heated by a filament transformer T4, connected across the A.C. supply lines 110. The filaments for the tubes in voltage regulator VR, and for the reject control circuit are heated from a separate secondary winding of the power transformer T3, connected to the voltage regulator by lines 118.

The output leads from the voltage regulator VR include a ground, or return line 122, and a B+ line 124, which provides a regulated voltage at +300 volts D.C. The reject control circuit includes probe current measuring circuit, or voltage divider, in the form of three resistances connected in a series between the B+ line 124 and the ground line 122. These resistances are a fixed primary resistance R4, a trigger level potentiometer P1, and a second fixed resistance R5, connected to the potentiometer at point "g."

The signal control or trigger portion of the reject control circuit is a cathode coupled, binary trigger tube, which has two triode sections, V2A and V2B. The tube illustrated is type 12AU7, and this tube is connected to operate in the well known Schmidt trigger circuit. The center tap of the voltage dividing trigger level potentiometer P1 previously described, is connected to the grid of section V2A of the double triode tube, through a high value grid resistor R6. The center tap of the potentiometer P1 can be adjusted so that the voltage dividing network R4, P1, and R5 provides a voltage on the grid of section V2A that is sufficiently positive to render that section normally conducting. The grid of the normally conducting side V2A of the cathode coupled binary tube is also connected to the high voltage contact probes 60, through the lead 86 previously referred to, and through a high value resistor R7. When a sound egg is being tested, the arrangement is such that the grid of section V2A is at a potential that renders section V2A conducting.

The cathodes of both tube sections V2A and V2B are connected together in the usual manner employed in the Schmidt trigger circuit, these cathodes being connected to the ground line 122 by a cathode bias resistor R8.

Voltage for the plate of the normally conducting section V2A of the double triode tube is supplied by the usual plate load resistor R9 connected to the regulated B+ supply. The grid of the right hand section V2B of the double triode, is normally biased to cut off through a grid resistor R10 and a negative bias supply circuit to be described presently. In accordance with the usual connections of the Schmidt trigger binary, the plate of the normally conducting section V2A is connected directly (point "p") to the grid of the other, normally cut off section V2B, by a coupling resistor R11.

The B+ supply for the plate of the section V2B of the double triode, is supplied to the winding of a reject signal solenoid S. Connected in parallel with this solenoid winding, are a resistor R12 and a condenser C4, which facilitates demagnetization of the solenoid S, when the right hand section V2B of the binary is cut off after it has been conducting.

As previously mentioned a negative fixed bias is supplied through resistor R10 to the grid of section V2B of the double triode. This negative bias originates in a lead 130 connected to one side of the secondary of the power transformer T3. The line 130 connects to a rectifier and voltage regulator including a diode D3, a pair of smoothing resistors R13 and R14 in series, and a filter condenser C5 connected from the junction of resistors R13, R14 to ground. Resistor R14 connects to a rectified bias supply line 132. A voltage regulator tube V3, which is of the OA2 type, also connects from the rectified negative bias supply line 132 to ground. Line 132 therefore supplies regulated D.C. at −150 volts to the resistor R10, in the grid circuit of the right section V2B of the double triode. As mentioned, this bias circuit is such that the grid of section V2B is normally biased to cut off, and hence that section is non-conducting unless a cracked egg is detected, as will be described.

Returning to the reject signal solenoid S, +300 volts D.C. is supplied by a line 134 to one of the contacts closed by the solenoid. The usual contactor 136 is operated by the armature of solenoid S. When contactor 136 is pulled in, it directs voltage from line 134 to a line 138, connected to the other solenoid contact. Contactor 136 is normally open, and is only closed when the right hand section V2B is conducting. When the contactor 136 is closed, D.C. is sent by means of a line 139, to a memory device and to a reject unit, neither of which form part of the present invention. A memory device of the type useful in egg handling systems is described in detail in the aforesaid patent to Mumma 2,895,274. A visual indication of the reject signal is provided by an indicator lamp 140, which is connected from the line 138 to ground through a current limiting resistor R15.

Reference has been made to the circuit ready cam 92, and the switch arm 102. When the switch arm 102 closes its associated contacts 106, 108 as indicated in FIG. 3, a line 142 which connects between voltage dividing resistor R5 and the lower end of the potentiometer P1, is shorted to ground through a line 144 leading from contact 108. A capacitor C6 is connected in parallel with resistor R5, to reduce surges and arcing at the contacts, when switch arm 102 is operated. This completes the description of the circuitry involved in the present invention.

*Operation.*—In operation, eggs are loaded between adjacent rollers 12 on the conveyor C as previously described, and these eggs are brought beneath the rows of probes 30 and 60, it being recalled that a high negative potential exists across these probes. As has been mentioned, the conveyor C moves intermittently, and during the dwell period the rollers 12 are turned by frictional engagement with V-belt 24, which causes the eggs E to rotate beneath the probes.

As an egg approaches the probes, but before it engages them, the ready cam 92 will be at a position that is displaced approximately 180° from the position illustrated in the diagram of FIG. 3. Cam lobe 104a now lifts the switch contact arm 102, and removes the ground connection of ground line 144 from contact 108 to line 142. Thus when switch arm 102 is so lifted, resistor R5 is not shorted out to ground at point "g" as before, but is introduced into the voltage divider circuit that includes R4 and P1 for biasing the grid of section V2A of the double triode tube. Introduction of resitsor R5 in the voltage divider circuit renders point "g" more positive, which increases the positive potential on the grid of V2A, and ensures that section V2A will be in its normal, conducting condition, with which no reject signal can be given.

In accordance with the known mode of operation of a Schmidt trigger circuit, as soon as section V2A of the triode is rendered conducting, the point "p" at the plate of V2A (to which the grid coupling resistor R11 for the grid of V2B is connected) is at its lower, or least positive voltage. This is due to the voltage drop that occurs in plate load resistor R9, when section V2A is conducting. This condition, coupled with the negative bias supplied to the grid of the right section V2B through line 132, ensures that the right section V2B will be cut off, the solenoid S will be de-energized, and no reject signal can be produced, when cam lobe 104a lifts contactor 102.

As the egg E to be tested approaches the probes, it will be rotating as previously mentioned, and before the time the egg is pressed against both sets of probes, the ready cam 92 will have been turned so as to permit the switch arm 102 to make contacts 106, 108. This connects line 142 from point "g" at the lower end of the potentiometer P1 to ground, through lines 142, 144. The potential applied to the grid of the normally conducting section V2A is now rendered more negative than before, which renders section V2A more sensitive to further changes in the grid voltage in the negative direction. Tube section V2A is now easily driven to cut-off by a signal from the probes.

If the egg E being tested is uncracked, its shell will act as a high resistance or insulator, and very little current will flow across the probes and through the eggshell. Thus, very little current flows through resistance R7 connected to the grid of section V2A, and the potential on the grid of section V2A is relatively unaffected when a sound egg is being tested. As stated, the trigger lever potentiometer P1 is adjusted so that the bias on the grid of V2A is such as to render section V2A conducting when a sound egg is under inspection, even though resistor R5 is shorted out by the ready cam 92. Conduction of V2A lowers the voltage at the connection of R11 to the plate of section V2A (point "p") due to the voltage drop in the plate load resistor R9. The connection of R11 to the grid of V2B ensures that this voltage drop will hold section V2B in its normal, non-conducting state.

When a cracked egg is being inspected, due to rotation of the eggs beneath the probes, the crack 17 will usually partially or completely bridge at least one of each set of probes. The ready cam 92 will have grounded out resistor R5, as indicated in FIG. 3. Also, a lower resistance path is now provided between the probes by the cracked egg, and the current flow through resistor R7, connected directly to the grid of V2A, increases. This renders the grid of V2A more negative, and as mentioned, the trigger level potentiometer P1 will have been set so that V2A will now be cut off.

Current flow through the V2A plate load resistor R9 now ceases, and the plate potential at the connection (point "p") of coupling resistor R11 to the plate of V2A goes more positive. Thus the potential on the grid of V2B also goes more positive, the effect of the negative grid bias to the grid resistor R10 of V2B is overcome, and V2B conducts. The coupling of both cathodes to the single bias resistor R8 accelerates the trigger action.

When V2A conducts, the coil of solenoid S is energized, contactor 136 is drawn in, and a reject signal appears on line 138. Signal lamp 140 lights, and the reject signal is passed on to the memory and hence to the reject mechanism (not shown) through line 139.

After the egg clears the probes, ready cam 92 will be about one half turn from the position illustrated in FIG. 3. Cam lobe 104a lifts switch arm 102 to open contacts 106, 108, which disconnects line 142 from ground line 144. Also, clearance of the probes by the egg removes the conductive path between them caused by the crack. These actions insure that the grid of V2A goes positive again, with which V2A conducts. This cuts off V2B through the combined plate-grid effect of R11 and the action at the coupled cathodes. The coil of solenoid S is de-energized and the circuit is readied for another inspection.

Having completed a detailed description of the invention so that one skilled in the art may practice the same, we claim:

1. The method of inspecting an agg for the detection of cracks in the shell of the egg, comprising the steps of making electrical contacts with the egg shell along narrow, circumferentially spaced generally parallel zones that extend along a major portion of the longitudinal extent of the egg shell, establishing a large difference in potential across the narrow contact zones, rotating the egg around its longitudinal axis while maintaining the electrical contact along said zones, sensing the current being conducted by the egg shell between the contact zones, and providing a reject signal when the current flowing through the egg shell between the narrow contact zones is substantially greater than the current that flows between the contact zones upon inspection of an egg having an uncracked shell.

2. Apparatus for testing for cracked egg shells comprising means for rotating an egg to be tested about its longitudinal axis, a housing, two spaced, narrow, generally parallel rows of flexible, electrically conducting probes mounted in said housing, each row of probes contacting the egg shell substantially along the entire longitudinal extent thereof, means for applying a high electrical potential across said rows of probes, a reject control circuit comprising means for sensing the current flowing through the egg shell between said rows of probes, and a trigger circuit for producing a reject signal in response to the current flowing between said rows of probes when a cracked egg is tested, said reject control circuit including means for preventing production of a reject signal in response to the small current that flows between said rows of probes when an uncracked egg is tested.

3. The apparatus of claim 2, wherein said probes are pivotally mounted in the housing, with each probe being independently mounted.

4. The apparatus of claim 2, wherein said probes have egg contacting tips, with the two rows of tips being closely spaced.

References Cited by the Examiner

UNITED STATES PATENTS

| 2,101,381 | 12/37 | Appleyard | 209—81 |
| 2,149,686 | 3/39 | Rivenburgh | 209—81 |
| 2,860,777 | 11/58 | Ortegren | 209—81 X |
| 2,978,952 | 4/61 | Stucky | 207—73 X |

FOREIGN PATENTS

| 131,252 | 2/49 | Australia. |
| 575,516 | 5/59 | Canada. |

ROBERT B. REEVES, *Acting Primary Examiner*.